United States Patent
Kasai et al.

(10) Patent No.: US 12,556,817 B2
(45) Date of Patent: Feb. 17, 2026

(54) IMAGE PROCESSING DEVICE AND IMAGE PROCESSING METHOD

(71) Applicants: Nissan Motor Co., Ltd., Kanagawa (JP); RENAULT S.A.S., Boulogne-Billancourt (FR)

(72) Inventors: Jun Kasai, Kanagawa (JP); Hirofumi Inoue, Kanagawa (JP); Yu Shikoda, Kanagawa (JP); Masaki Okamoto, Kanagawa (JP); Takehito Teraguchi, Kanagawa (JP); Fangge Chen, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 175 days.

(21) Appl. No.: 18/282,745

(22) PCT Filed: Mar. 18, 2021

(86) PCT No.: PCT/IB2021/000167
§ 371 (c)(1),
(2) Date: Sep. 18, 2023

(87) PCT Pub. No.: WO2022/195312
PCT Pub. Date: Sep. 22, 2022

(65) Prior Publication Data
US 2024/0163555 A1 May 16, 2024

(51) Int. Cl.
*H04N 23/68* (2023.01)
*H04N 23/667* (2023.01)

(52) U.S. Cl.
CPC ......... *H04N 23/683* (2023.01); *H04N 23/667* (2023.01); *H04N 23/6812* (2023.01)

(58) Field of Classification Search
CPC ............... H04N 23/683; H04N 23/667; H04N 23/6812; H04N 7/181; H04N 23/68; G06T 5/73; G06T 2207/20201
(Continued)

(56) References Cited

U.S. PATENT DOCUMENTS

| 2009/0009613 | A1* | 1/2009 | Chien | H04N 23/68 348/208.1 |
| 2010/0150537 | A1* | 6/2010 | Tsuchihashi | H04N 23/686 359/557 |
| 2013/0128121 | A1* | 5/2013 | Agarwala | H04N 13/221 348/E5.077 |

FOREIGN PATENT DOCUMENTS

| JP | 2006-040055 A | 2/2006 |
| JP | 2017028527 A * | 2/2017 |

(Continued)

*Primary Examiner* — Thai Q Tran
*Assistant Examiner* — Stephen R Smith
(74) *Attorney, Agent, or Firm* — Osha Bergman Watanabe & Burton LLP

(57) ABSTRACT

An image processing device is disclosed that includes an image acquisition unit configured to acquire a captured image captured by an imaging device fixed to a moving object; a behavior data acquisition unit configured to acquire behavior data indicating behavior of the moving object when moving; a determination unit configured to determine whether or not the captured image includes scenery outside the moving object; and an image processing unit configured to, when the captured image is determined to include the scenery outside the moving object, perform shake correction processing on the captured image based on the behavior data acquired by the behavior data acquisition unit so as to cancel the shaking of the captured image due to the behavior.

12 Claims, 5 Drawing Sheets

(58) Field of Classification Search
USPC .............................. 348/148, 208.99; 396/55
See application file for complete search history.

(56) References Cited

FOREIGN PATENT DOCUMENTS

| JP | 2018-157319 A | | 10/2018 |
|----|---------------|---|---------|
| JP | 2019033408 A | * | 2/2019 |
| JP | 2019092001 A | * | 6/2019 |
| JP | 2020-129019 A | | 8/2020 |

* cited by examiner

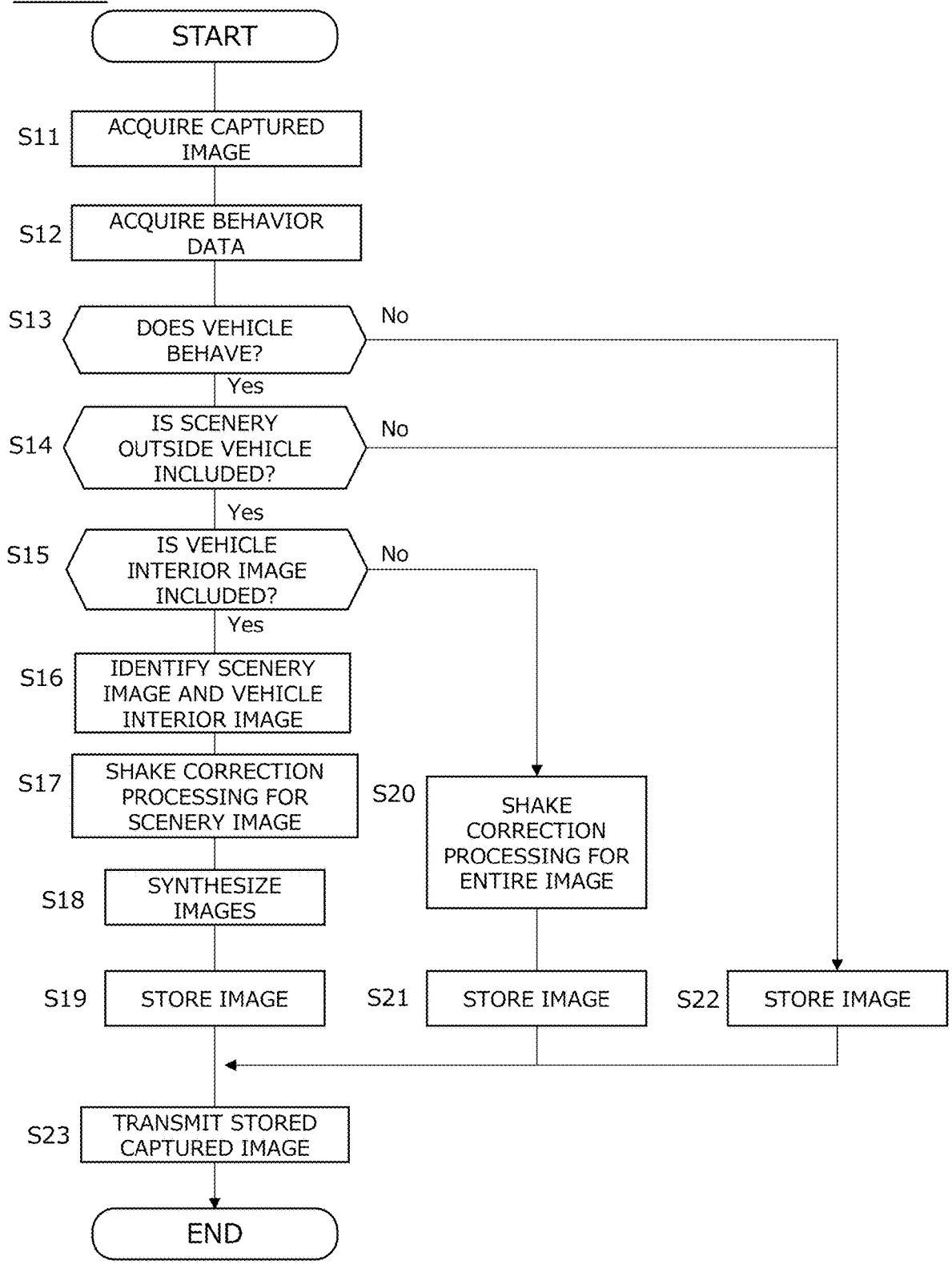

IMAGE PROCESSING DEVICE AND IMAGE PROCESSING METHOD

TECHNICAL FIELD

The present invention relates to an image processing device and an image processing method.

BACKGROUND ART

There is known an imaging device including: a driving means for rotating an imaging means including an imaging optical system and an imaging element to change the imaging direction of the imaging means; an image correction means for correcting a captured image captured by the imaging means by image processing; and a control means for acquiring a detection signal from a detection means for detecting the vibration of the imaging means. In this imaging device, the control means performs first control for controlling the driving means to control image shake correction of the captured image, and second control for controlling the image correction means to control the image shake correction of the captured image for vibration remaining in the image shake correction under the first control (PTL 1).

CITATION LIST

Patent Literature

[PTL 1] Japanese Patent Application Publication No. 2020-129019

SUMMARY OF INVENTION

Technical Problem

The imaging device described in PTL 1 has a problem that for a captured image having a part that becomes stationary due to shaking with the vibration of the imaging means, when image shake correction is performed on the entire captured image, the correction processing is performed even on a stationary part that does not require the image shake correction, resulting in the stationary part moving unnaturally.

A problem to be solved by the present invention is to provide an image processing device and an image processing method that are capable of performing shake correction processing on an image that shakes due to the behavior of a moving object when moving.

Solution to Problem

The present invention solves the above problem by: determining whether or not a captured image includes a scene outside a moving object; and when the captured image is determined to include the scene outside the moving object, performing, based on behavior data indicating behavior of the moving object when moving, shake correction processing on the captured image so as to cancel shaking of the captured image due to the behavior.

Advantageous Effects of Invention

According to the present invention, it is possible to prevent image shaking due to the behavior of a moving object when moving.

BRIEF DESCRIPTION OF DRAWINGS

FIG. 5 is a flowchart illustrating an example of the procedure of an image processing method in the image processing device according to the embodiment.

DESCRIPTION OF EMBODIMENTS

First Embodiment

Figure 1:
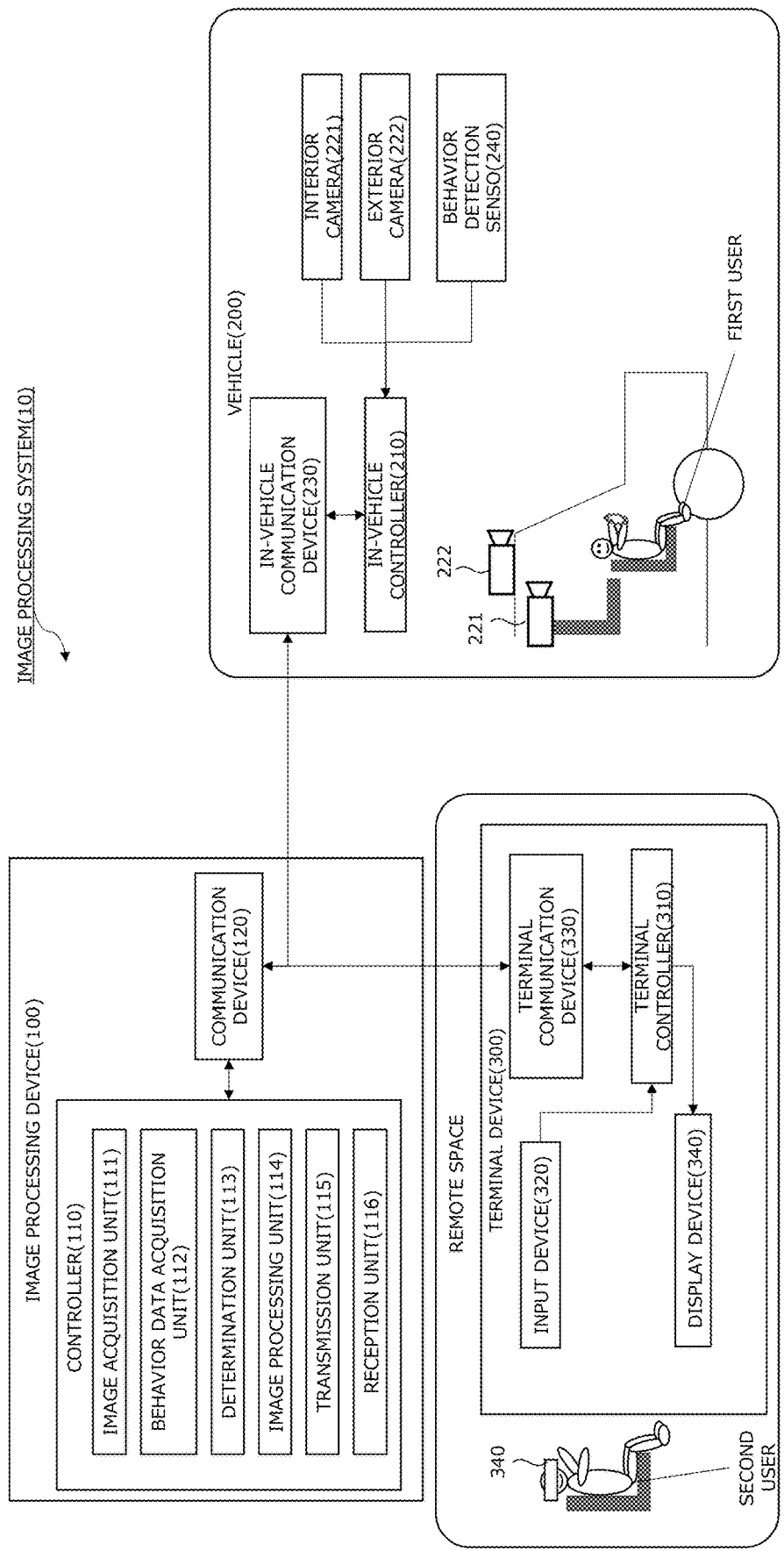
FIG. 1 is a block diagram of an image processing system according to an embodiment.

An embodiment of an image processing device according to the present invention will be described with reference to the drawings. FIG. 1 is a block diagram illustrating an example of the configuration of an image processing system 10 including the image processing device 100 according to the present embodiment. As illustrated in FIG. 1, the image processing system 10 includes the image processing device 100, a vehicle 200, and a terminal device 300 in the present embodiment. The image processing device 100 is a server capable of communicating with the vehicle 200 and the terminal device 300 to exchange information. Constructing a network among the image processing device 100, the vehicle 200, and the terminal device 300 allows the image processing system 10 to perform task processing with a high computational load via the network, and also make it easy to change the algorithm. This makes it possible to provide versatile services at high speed. The image processing device 100 acquires an image of the interior of the vehicle 200 and/or an image of the exterior of the vehicle 200 from the vehicle 200, performs image processing on the acquired image as necessary, and transmits the resulting image to the terminal device 300 to display the image of the interior of the vehicle 200 and/or the image of the exterior of the vehicle 200 to a second user. The terminal device 300 is located in a remote space away from the vehicle 200. The remote space is a place where the image processing device 100 is installed and a place away from the vehicle 200, such as the location of the second user. Note that, in the following description of the image processing system 10, the vehicle 200 is taken as an example of a moving object, but the moving object is not limited to the vehicle 200, and may be a moving object such as a ship or an airplane, for example.

A first user is an occupant riding in the vehicle 200. In the example of FIG. 1, the first user is the driver of the vehicle 200. However, the first user may be an occupant in the front passenger seat or the rear seat. The second user can wear a display device 340 of the terminal device 300 over the user's eyes to enjoy driving in virtual space with the first user riding in the vehicle 200 while viewing the display screen of the display device 340. The second user can also use the terminal device 300 to have a conversation with the first user.

The image processing device 100 includes a controller 110 and a communication device 120. The controller 110 includes a computer having hardware and software. This computer includes a ROM that stores a program, a CPU that executes the program stored in the ROM, and a RAM that functions as an accessible storage device. Note that the operable circuits to be used include, instead of or together with the CPU, an MPU, a DSP, an ASIC, an FPGA, and the like.

The controller 110 includes at least, as functional blocks, an image acquisition unit 111, a behavior data acquisition unit 112, a determination unit 113, an image processing unit 114, a transmission unit 115, and a reception unit 116. Each functional block executes the corresponding function in cooperation with software and hardware for implementing the function or executing the corresponding process. In the present embodiment, the functions of the controller 110 are divided into six blocks, and the function of each functional block will be described. However, the functions of the controller 110 do not necessarily have to be divided into six blocks, and may be divided into five or less functional blocks or seven or more functional blocks. The controller 110 acquires a captured image(s) captured by an interior camera 221 and/or an exterior camera 222 from the vehicle 200 traveling to acquire behavior data indicating the behavior of the vehicle 200 when traveling. Based on the behavior data, the controller 110 performs shake correction processing on the captured image so as to cancel the shaking of the captured image due to the behavior of the vehicle 200, and transmits to the terminal device 300 the captured image on which the shake correction processing has been performed. Each functional block included in the controller 110 will be described below.

Figure 2:
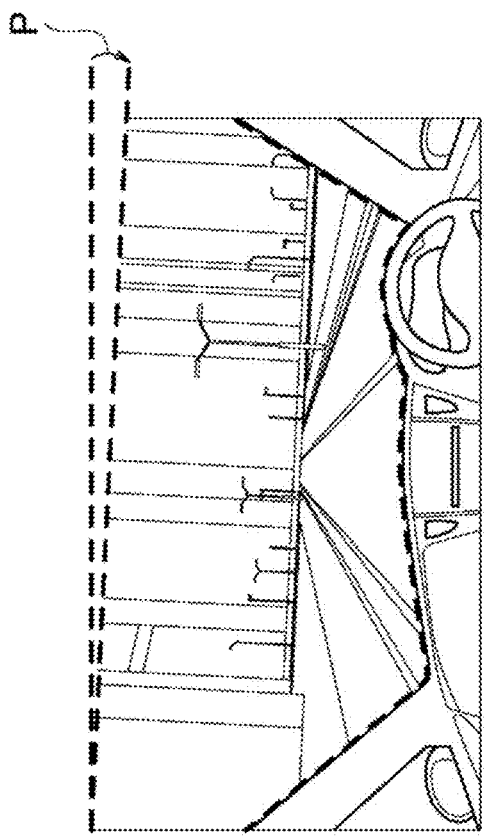
FIG. 2 illustrates examples of a captured image from an interior camera.
Figure 2:
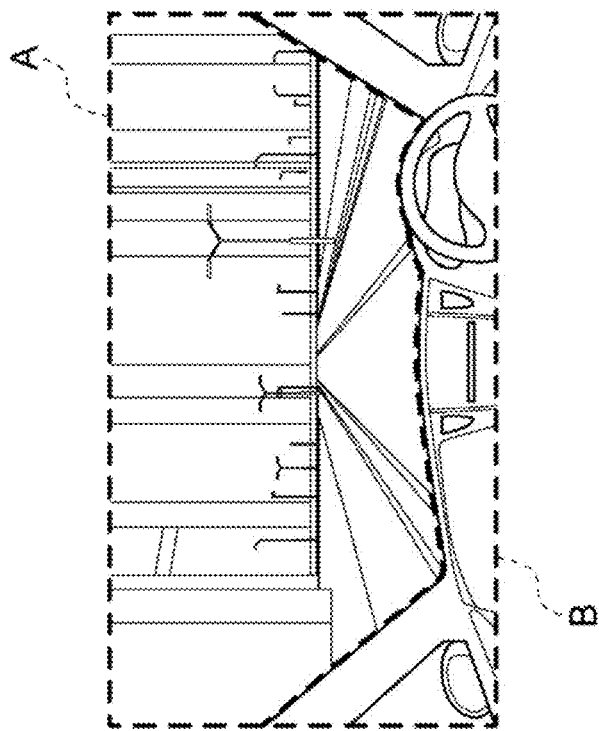

The image acquisition unit 111 acquires a captured image(s) captured by the interior camera 211 and/or the exterior camera 222. The captured image includes a vehicle interior image (moving object interior image) representing the interior of the vehicle such as a dashboard and pillars, and/or a scenery image representing scenery including buildings and nature outside the vehicle. For example, when the interior camera 211 captures the scenery through a window of the vehicle and pillars and the dashboard are present in the frame, the captured image from the interior camera 211 includes a scenery image and a vehicle interior image. In FIG. 2, (a) is an example of a captured image from the interior camera 211. In the example of (a) of FIG. 2, the image within a region A where the scenery appears is the scenery image, and the image within a region B where the pillars and the dashboard appear is the vehicle interior image.

The behavior data acquisition unit 112 acquires behavior data indicating the behavior of the vehicle when traveling (moving). The behavior is the vibration of the vehicle 200 when traveling. The behavior data is data detected by a behavior detection sensor 240 in the vehicle 200. The behavior of the vehicle 200 is represented by the vertical movement (vibration) of the vehicle 200, the rotation of the vehicle 200 about the vertical axis of the vehicle 200, the inclination of the vehicle 200, and the like. The vertical direction of the vehicle 200 is normal to the surface on which the vehicle 200 is traveling. The data detected by the behavior detection sensor 240 is vibration wave data indicating the vertical movement of the vehicle 200 and the rotation of the vehicle 200 about the vertical axis. For example, when the data detected by the behavior detection sensor 240 includes data indicating the vibration of the vehicle 200 in the vertical direction, the behavior data acquisition unit 112 identifies the movement of the vehicle 200 in the vertical direction. Further, when the data detected by the behavior detection sensor 240 includes data indicating the rotation of the vehicle 200 about the vertical axis, the behavior data acquisition unit 112 identifies the rotation of the vehicle 200 about the vertical axis. The behavior data acquirer 112 may identify the vertical movement and rotation of the vehicle 200 about the vertical axis. Note that the behavior data acquisition unit 112 may acquire, as behavior data, a captured image(s) from the interior camera 221 and/or the exterior camera 222 instead of the data detected by the behavior detection sensor 240.

The determination unit 113 determines whether or not the vehicle behaves based on the behavior data acquired by the behavior data acquisition unit 112. Specifically, the determination unit 113 identifies a vibration wave having a specific frequency from the behavior data, and compares the amplitude value (magnitude of amplitude) of the identified vibration wave with a predetermined amplitude threshold. Then, if the amplitude value of the vibration wave is equal to or greater than the amplitude threshold, the determination unit 113 determines that the vehicle behaves. The specific frequency of the vibration wave is a frequency in a preset specific frequency band, and the specific frequency band is a vibration frequency range that affects human motion sickness due to image shaking. The amplitude threshold indicates the lower limit of the vibration amplitude that causes VR sickness, and is determined by an experimental value, an empirical value, or the like. Note that "VR sickness" will be described later. Further, the determination unit 113 determines whether or not the captured image acquired by the image acquisition unit 111 includes the scenery outside the vehicle 200. The interior camera 221 and the exterior camera 222 are fixed to the vehicle 200, and accordingly, when the vehicle behaves, the captured images from the interior camera 221 and the exterior camera 222 shake according to the behavior of the vehicle 200. In addition, the vehicle interior image is an image in which a part of the vehicle appears such as pillars, and accordingly, it vibrates according to the behavior of the vehicle 200. On the other hand, the scenery image does not vibrate according to the behavior of the vehicle 200. Then, the entire images captured by the interior camera 221 and the exterior camera 222 shake according to the behavior of the vehicle 200, and the vehicle interior image shakes in synchronization with the behavior of the vehicle 200. Therefore, the vehicle interior image does not appear to vibrate. On the other hand, the scenery image does not shake according to the behavior of the vehicle 200, and therefore, it appears to vibrate. In other words, when the vehicle 200 behaves, the scenery image shakes and the vehicle interior image does not shake in appearance of the captured images. In the example of FIG. 2, the image in the region A shakes, and the image in the region B does not shake. Further, when the vehicle behaves, the captured image from the exterior camera 222 shakes as a whole.

Then, when the captured image that shakes due to the behavior of the vehicle 200 is displayed to the second user, the second user may feel "VR sickness". The second user is in a remote location and does not directly feel the shaking of the vehicle 200. When the second user views the captured image that shakes due to the behavior of the vehicle 200, the second user does not feel vibration in viewing the image that shakes. Therefore, the second user is in a state of visually induced motion sickness because the sense of vision and the sense of the semicircular canals do not match due to the shaking of the image. Such a state is "VR sickness".

When the behavior data acquisition unit 112 acquires, as behavior data, a captured image(s) from the interior camera 221 and/or the exterior camera 222, the determination unit 113 may determine whether or not the vehicle behaves based on the captured image(s). The determination unit 113 identifies the movement of the vehicle 200 by using image movement information such as optical flow that can be acquired from the captured image(s) from the interior camera and/or the exterior camera 222, and determines whether or not the movement of the vehicle 200 is due to the behavior. For example, when the movement of the vehicle 200 is a periodic movement, it can be estimated that the movement is not caused by the traveling of the vehicle 200 but is vibration of the vehicle 200 received from the road surface or vibration caused by the engine of the vehicle 200. The determining unit 113 determines whether or not the vehicle 200 behaves by identifying the periodic movement of the vehicle 200 due to the behavior of the vehicle 200 from the captured image.

Based on the determination result of the determination unit 113 and the behavior data acquired by the behavior data acquisition unit 112, the image processing unit 114 performs shake correction processing on the captured image so as to cancel the shaking of the captured image due to the behavior of the vehicle 200. When the captured image includes a scenery image, the image processing unit 114 performs shake correction processing on the captured image so as to cancel the shaking of the scenery image. Further, when the entire captured image is a scenery image, the image processing unit 114 performs shake correction processing on the entire captured image. The shake correction processing is a process of processing a scenery image so as to cancel the shaking of the scenery image. A known image processing method for correcting shaking may be used for the shake correction processing. For example, when the scenery image shakes at a predetermined cycle, the image processing unit 114 performs the shake correction processing by applying an opposite-phase displacement to the scenery image. This makes it possible to reduce the image shaking caused by the behavior of the vehicle 200.

For example, the image processing unit 114 calculates the shake amount and shake cycle of the image due to the shaking of the scenery image from the vibration amplitude and vibration frequency of the vehicle 200 identified by the behavior data acquisition unit 112, and corrects the position of the scenery image according to the calculated shake cycle so as to return the displacement corresponding to the shake amount. In FIG. 2, (b) is an example of a captured image from the interior camera 211 when the vehicle 200 behaves. Note that (a) and (b) of FIG. 2 are images of the same scenery when viewed through the windshield from the same vehicle 200 in the same position. In FIG. 2, (a) illustrates a captured image with the scenery image not shaking due to the behavior of the vehicle 200, and (b) illustrates a captured image with the scenery image shaking due to the behavior of the vehicle 200. As indicated by an arrow P in (b) of FIG. 2, the scenery image is shifted clockwise due to the shaking. Note that in (b) of FIG. 2, the image of the portion indicated by the arrow P is not shown in order to explain the shaking of the scenery image due to the shaking, but the corresponding scenery image actually appears. In such a case, the image processing unit 114 corrects the captured image by rotating the scenery image counterclockwise by the shift indicated by the arrow P. In the example of (b) of FIG. 2, the shake correction processing is performed by rotating the scenery image. However, the image processing unit 114 may correct the position of the scenery image in the horizontal direction and/or the vertical direction of the scenery image as the shake correction processing.

Figure 3:
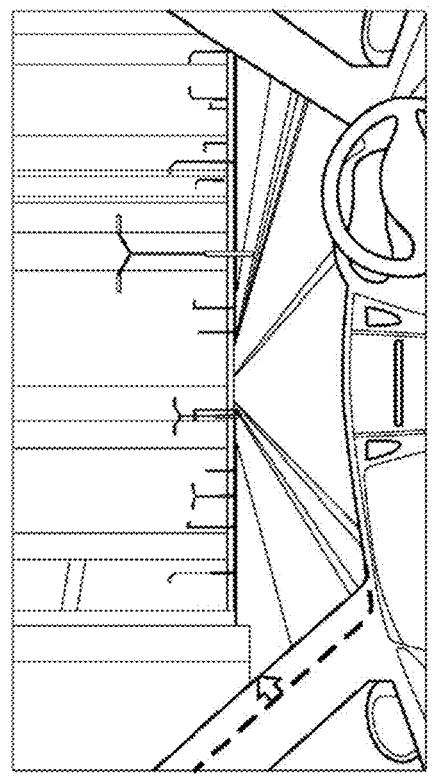
FIG. 3 illustrates examples of a captured image from the interior camera.
Figure 3:
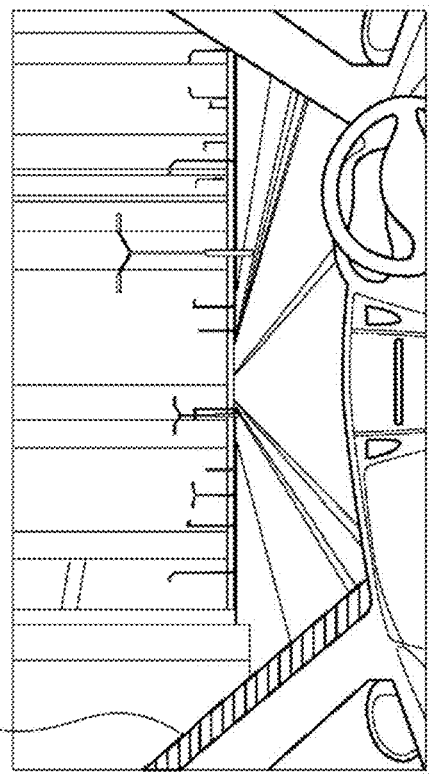

The image processing unit 114 may perform image processing on a boundary portion between the scenery image on which the shake correction processing has been performed and the vehicle interior image to correct the shift between the scenery image on which the shake correction processing has been performed and the vehicle interior image. FIG. 3 is an example of a captured image from the interior camera 211. In FIG. 3, (a) is a captured image with the shift between the scenery image on which the shake correction processing has been performed and the vehicle interior image being not corrected. In FIG. 3, (b) is a captured image with the shift between the scenery image on which the shake correction processing has been performed and the vehicle interior image being corrected. As illustrated in (a) of FIG. 3, the scenery image shakes due to the behavior of the vehicle 200, and shake correction processing is performed on the scenery image so as to cancel the shaking. First, the image processing unit 114 identifies the vehicle interior image and the scenery image from the captured image. The image processing unit 114 performs shake correction processing so that the scenery image moves diagonally to the upper right on the sheet of (a) of FIG. 3. There is a shift (gap: see an arrow Q in (a) of FIG. 3) between the scenery image on which the shake correction processing has been performed and a pillar (window frame) included in the vehicle interior image due to the movement of the scenery image. In the example of FIG. 3, the image processing unit 114 identifies the pillar included in the vehicle interior image as a boundary. The boundary portion between the vehicle interior image and the scenery image is a boundary portion between an image on which the shake correction processing has not been performed and an image on which the shake correction processing has been performed. Therefore, the synthesis of these images may cause a gap therebetween. In such a case, the image processing unit 114 performs image processing on the pillar to fill in the gap. As illustrated in (b) of FIG. 3, the image processing unit 114 thickens the pillar so as to fill in the gap. Note that the image processing unit 114 may enlarge the image of the boundary portion in the vehicle interior image, not limited to the pillar, so that the gap of boundary portion between the image on which the shake correction processing has been performed and the image on which the shake correction processing has not been performed in the captured image is eliminated. The image of the shake correction boundary portion is a boundary between the scenery image and the vehicle interior image. Further, the image processing unit 114 may enlarge the image of the boundary portion in the scenery image so that the gap of boundary portion between the image on which the shake correction processing has been performed and the image on which the shake correction processing has not been performed in the captured image is filled. Further, instead of or in addition to enlarging the image, the image processing unit 114 may process the color of the boundary portion so that the difference between the image on which the shake correction processing has been performed and the image on which the shake correction processing has not been performed in the captured image becomes less noticeable.

For a captured image including a vehicle interior image and a scenery image, when the image processing unit 114 performs shake correction processing on the scenery image, the image processing unit 114 synthesizes the scenery image on which image processing has been performed by the shake correction processing and the vehicle interior image on which image processing has not been performed by the shake correction processing. Note that, for a captured image being a scenery image as a whole, when the image processing unit 114 performs shake correction processing on the scenery image, the image processing unit 114 does not need to perform image synthesis. Further, when the image processing unit 114 performs image processing on the vehicle interior image so as to fill in the gap of boundary portion with the image on which the shake correction processing has not been performed, the image processing unit 114 synthesizes the scenery image on which the shake correction processing has been performed and the vehicle interior image on which the image processing has been performed.

When the image processing unit 114 performs shake correction processing on the captured image, the image processing unit 114 stores, in a memory, image data on which the shake correction processing has been performed. For a captured image including a vehicle interior image and a scenery image, the image data on which the shake correction processing has been performed is data of the captured image on which the synthesis processing has been performed. Further, when the vehicle does not behave in such a way as to cause VR sickness, the image processing unit 114 does not perform shake correction processing on the captured image and stores, in the memory, data of the captured image on which image processing has not been performed by the shake correction processing.

The transmission unit 115 transmits to the terminal device 300 via the communication device 120 a control signal for causing the terminal device 300 to display the image on which the image processing has been performed by the image processing unit 114. The reception unit 116 receives operation information input to an input device 320 by the second user. The operation information is an operation command or the like for acquiring a VR image to the vehicle 200.

Next, the vehicle 200 will be described. The vehicle 200 includes an in-vehicle controller 210, the interior camera 221, the exterior camera 222, an in-vehicle communication device 230, and the behavior detection sensor 240. The in-vehicle controller 210 controls the functions of the devices and sensors of the vehicle 200. The in-vehicle controller 210 outputs to the in-vehicle communication device 230 the captured image(s) captured by the interior camera 221 and/or the exterior camera 222 and the detection data detected by the behavior detection sensor 240.

The interior camera 221 is fixed inside the vehicle, captures an image of the inside of the vehicle and/or an image of the outside of the vehicle from a position fixed inside the vehicle, and outputs the captured image data to the in-vehicle controller 210. The interior camera 221 captures an image of the scenery outside the vehicle through a window. Note that the interior camera 221 may be a camera that can be removed from a predetermined fixed position inside the vehicle. For example, a mobile terminal such as a smartphone may be brought into the vehicle, fixed by a holder or the like, and used as the interior camera 221. The exterior camera 222 is fixed to the body of the vehicle 200 or the like, captures an image of the scenery outside the vehicle and the surroundings of the vehicle 200, and outputs the captured image data to the in-vehicle controller 210. Note that each of the interior camera 221 and the exterior camera 222 does not necessarily have to be a single camera, and may be replaced with a plurality of cameras. Note that, in the case where a plurality of cameras are used, a plurality of images may be synthesized to form a vehicle interior image and a scenery image. This makes it possible to increase the resolution of the captured image.

The in-vehicle communication device 230 communicates with the communication device 120 to exchange data. Specifically, the in-vehicle communication device 230 receives a signal including an operation command for acquiring a VR image of the vehicle 200 from the communication device 120, and transmits a signal including a captured image and behavior data to the communication device 120.

The behavior detection sensor 240 is a sensor that detects the behavior of the vehicle 200 and is provided in the vehicle 200. A G sensor or the like is used for the behavior detection sensor 240. Note that the behavior detection sensor 240 is not limited to the sensor provided in the vehicle 200, and a mobile terminal with a built-in acceleration sensor may be brought into the vehicle and used as the behavior detection sensor 240. The behavior detection sensor 240, which is a mobile terminal, connects to the in-vehicle controller 210 via an in-vehicle network and transmits data indicating behavior to the in-vehicle controller 210.

The terminal device 300 is a device used by the second user in a remote space, and outputs a virtual image when viewed from a predetermined position in the vehicle 200 such as the front passenger's seat. The terminal device 300 may be installed in the remote space, for example. The terminal device 300 includes a terminal controller 310, the input device 320, a terminal communication device 330, and the display device 340. The terminal controller 310 controls the functions of the devices of the terminal device 300. Specifically, the terminal controller 310 outputs a control signal for causing the display device 340 to output the captured image indicated by the image data received by the terminal communication device 330 to the second user.

The input device 320 is a device operated by the second user, and is used by the second user to input operation information to the image processing device 100 for acquiring a VR image when viewed from a predetermined position of the vehicle 200.

The terminal communication device 330 communicates with the image processing device 100 and the in-vehicle communication device 230 of the vehicle 200 to exchange information. Specifically, the terminal communication device 330 receives the image data from the image processing device 100 and transmits operation information to the image processing device 100.

The display device 340 is a device that outputs to the second user the environment inside and outside the vehicle at a predetermined position inside or outside the vehicle. The display device 340 is, for example, a glasses-type or goggles-type VR head-mounted display, and is worn on the head of the second user. The second user can visually recognize virtual reality (VR) in which the environment inside and outside the vehicle is displayed through the terminal device 300. The display device 340 outputs a virtual image representing the environment inside and outside the vehicle, and virtual sound information indicating sound heard from a predetermined position inside or outside the vehicle. This makes it possible for the second user to see the scenery and hear sound as if the user were in the vehicle 200. In addition, the captured image from the exterior camera 222 enables the second user to see the scenery outside the vehicle 200. The display device 340 includes, for example, a non-transmissive display, a speaker, and the like.

Figure 4:
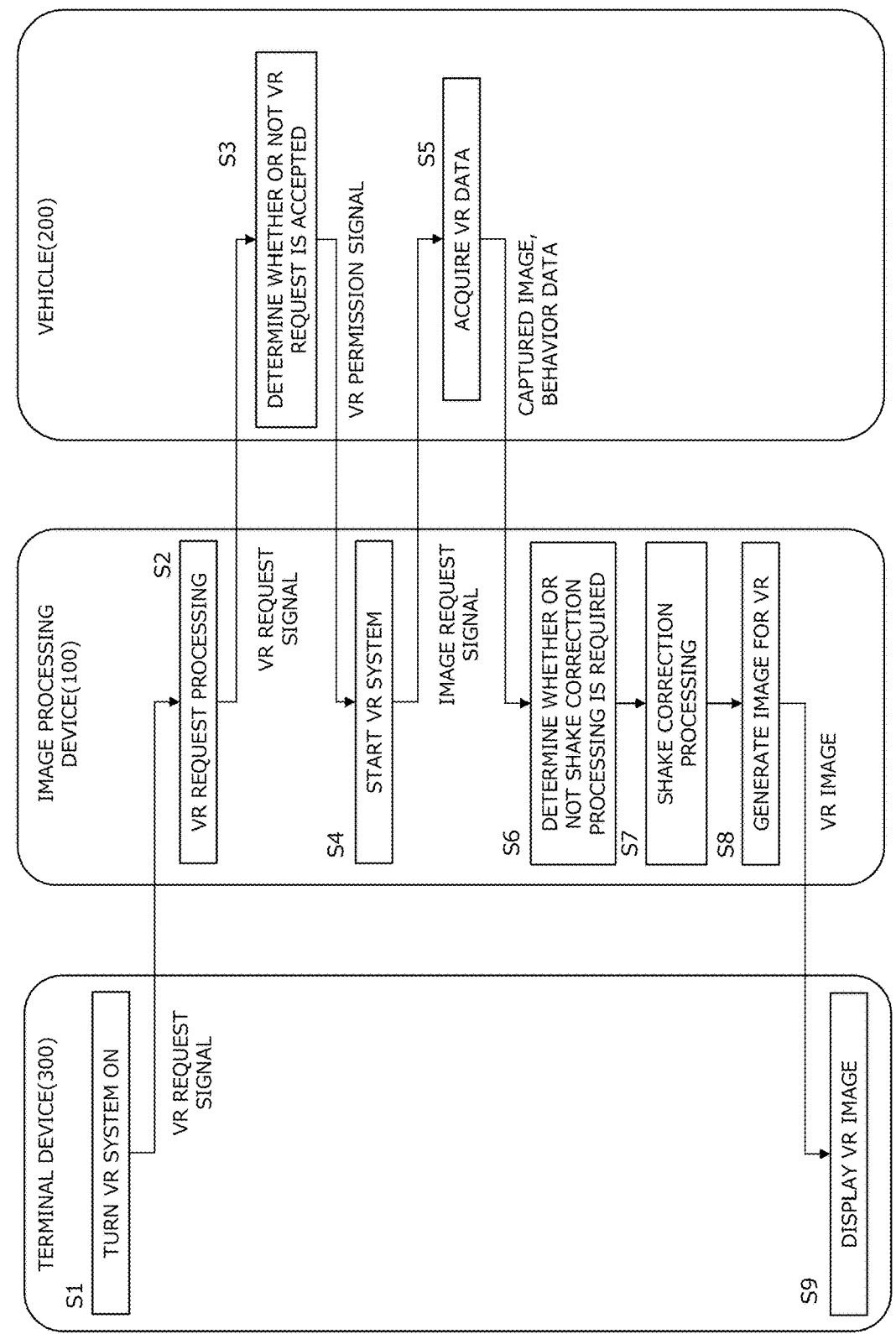
FIG. 4 is a flowchart illustrating an example of a sequence chart in the image processing system according to the embodiment.

Next, transmission and reception of data among the image processing device 100, the vehicle 200, and the terminal device 300, and data processing in each device will be described with reference to FIG. 4. FIG. 4 is a sequence chart illustrating a data flow in the image processing system 10.

In step S1, the second user operates the input device 320 to switch a VR system from off to on. The VR system is a system for realizing virtual reality of the environment inside and outside the vehicle by displaying images on the display device 340 to provide a space as if the second user were in the vehicle 200. When the VR system is switched from off to on, the terminal controller 310 transmits an operation signal for acquiring a VR image to the image processing device 100.

In step S2, in response to receiving a VR request signal from the communication device 120, the controller 110 of the image processing device 100 starts VR request processing. First, the controller 110 transmits the VR request signal to the in-vehicle communication device 230. In step S3, the in-vehicle controller 210 determines whether or not to accept the VR request based on the VR request signal received by the in-vehicle communication device 230. For example, in response to receiving the VR request signal, the in-vehicle controller 210 displays on a display in the vehicle a selection screen of whether or not to accept the VR request. Then, in response to an operation to accept the VR request from the first user, the in-vehicle controller 210 determines that the VR request is to be accepted. On the other hand, in response to an operation not to accept the VR request from the first user, the in-vehicle controller 210 determines that the VR request is not to be accepted. If it is determined that the VR request is to be accepted, the in-vehicle controller 210 uses the in-vehicle communication device 230 to transmit a VR permission signal to the image processing device 100.

In step S4, the controller 110 of the image processing device 100 receives the VR permission signal from the vehicle 200, starts the VR system, and transmits an image request signal to the vehicle 200 through the communication device 120. In step S5, the in-vehicle controller 210 acquires VR data from the interior camera 221, the exterior camera 222, and the behavior detection sensor 240. The VR data includes a captured image(s) from the interior camera 221 and/or the exterior camera 222 and data (behavior data) detected by the behavior detection sensor 240. The controller 110 transmits the acquired VR data to the image processing device 100.

In step S6, the controller 110 of the image processing device 100 determines whether or not shake correction processing is required for the captured image based on the captured image and behavior data included in the VR data. When the captured image includes a scenery image and the vehicle 200 behaves, the controller 110 determines that shake correction processing is required. When the captured image does not include a scenery image or the vehicle 200 does not behave, the controller 110 determines that shake correction processing is not required.

If it is determined that shake correction processing is required, the controller 110 performs shake correction processing on the captured image in step S7. In step S8, the controller 110 generates an image for VR display based on the image on which the shake correction processing has been performed. For example, when the captured image includes a scenery image and a vehicle interior image and the shake correction processing has been performed on the scenery image, the image processing unit 114 of the controller 110 synthesizes the scenery image on which the shake correction processing has been performed and the vehicle interior image, and generates a screen for VR display based on the synthesized image. For example, to display a character representing the first user in addition to the video inside the vehicle in a virtual reality space, the image processing unit 114 performs image processing so that an image representing the character is included in the synthesized image. Thus, the image processing unit 114 generates a captured image for VR display. Then, the controller 110 transmits data including the captured image for VR display to the terminal device 300. Note that character display is performed to protect the privacy of the first user. Instead of the character, only the first user's face region may be masked.

In step S9, the terminal controller 310 outputs the captured image for VR display received by the terminal communication device 330 to the display device 340, and the display device 340 displays a VR image.

Next, a detailed control flow of the controller 110 will be described with reference to FIG. 5. FIG. 5 is a flowchart illustrating the control flow of the controller 110.

In step S11, the image acquisition unit 111 of the controller 110 acquires a captured image(s) captured by the interior camera 221 and/or the exterior camera 222. In step S12, the behavior data acquisition unit 112 acquires behavior data indicating the behavior of the vehicle 200 when moving. In step S13, the determination unit 113 determines whether or not the vehicle 200 behaves based on the behavior data. If it is determined that the vehicle does not behave, the controller 110 performs control processing in step S22, which will be described later.

In step S14, the determination unit 113 determines whether or not the captured image includes the scenery outside the vehicle 200. Whether or not the scenery is included is determined by whether or not the captured image includes a scenery image. When the captured image does not include the scenery outside the vehicle 200, the controller 110 performs control processing in step S22, which will be described later.

When the captured image includes the scenery outside the vehicle 200, the determination unit 113 determines in step S15 whether or not the captured image includes an interior image of the vehicle 200 (vehicle interior image). When the captured image does not include a vehicle interior image, the controller 110 performs control processing in step S20, which will be described later.

When the captured image includes a vehicle interior image, the image processing unit 114 identifies in step S16 the scenery image and the vehicle interior image from the captured image. In step S17, the image processing unit 114 performs shake correction processing on the scenery image based on the behavior data so as to cancel the shaking of the captured image due to the behavior. On the other hand, the image processing unit 114 does not perform shake correction processing on the vehicle interior image. In other words, the image processing unit 114 does not perform shake correction processing on an image that is not affected by the behavior of the vehicle 200, but performs shake correction processing on an image that is affected by the behavior of the vehicle 200. This makes it possible to separate the image processing according to the shaking of the images for the images inside and outside the vehicle 200.

In step S18, the image processing unit 114 synthesizes the scenery image on which the shake correction processing has been performed and the vehicle interior image. In step S19, the image processing unit 114 performs image processing so that the synthesized captured image is an image for VR display, and stores, in the memory, data of the processed image.

In the control flow of step S15, if it is determined that the captured image does not include a vehicle interior image, the image processing unit 114 performs in step S20 shake correction processing on the entire captured image. In step S21, the image processing unit 114 performs image processing so that the image on which the shake correction processing has been performed is an image for VR display, and stores, in the memory, data of the processed image.

In the control flow of step S13, if it is determined that the vehicle does not behave, the image processing unit 114 performs in step S22 image processing so that the captured image acquired by the image acquisition unit 111 is an image for VR display, and stores the processed image data in the memory.

In step S23, the transmission unit 115 transmits the captured image stored in the memory to the terminal device 300 via the communication device 120.

In the present embodiment as described above, the image processing device acquires a captured image(s) captured by the interior camera 221 and/or the exterior camera 222 that are fixed to the vehicle 200; acquires behavior data indicating the behavior of the vehicle 200 when moving; determines whether or not the captured image includes the scenery outside the vehicle 200; and when the captured image is determined to include the scenery outside the vehicle 200, performs shake correction processing on the captured image based on the behavior data acquired by the behavior data acquisition unit 112 so as to cancel the shaking of the captured image due to the behavior. This makes it possible to prevent image shaking caused by the behavior of the vehicle 200 when moving. For example, when the second user in a remote location views an image shaking due to the behavior of the vehicle 200, the second user is not actually riding in the vehicle 200 and does not feel the vibrations of the vehicle 200, so that the second user may feel VR sickness. In the present embodiment, since the image shaking due to the behavior of the vehicle 200 when moving is suppressed, it is possible to reduce the VR sickness and also provide the experience as if the second user were riding in the vehicle 200.

Further, in the present embodiment, the image processing unit 114 identifies a scenery image and a vehicle interior image from the captured image; performs shake correction processing on the scenery image; and synthesizes the scenery image on which image processing has been performed by the shake correction processing and the vehicle interior image on which image processing has not been performed by the shake correction processing. This makes it possible for the second user to feel as if the second user were actually riding in the vehicle when the second user views the synthesized image and to be provided with an image with reduced VR sickness.

In the present embodiment, the image processing device 100 also includes the transmission unit 115 that transmits a signal including the captured image synthesized by the image processing unit 114 to the display device 340 located outside the vehicle 200. This makes it possible for the second user to feel as if the second user were actually riding in the vehicle and to be provided with an image with reduced VR sickness.

Further, in the present embodiment, the behavior data acquisition unit 112 identifies the vertical movement of the vehicle 200 and/or the rotation of the vehicle 200 about the vertical axis based on the behavior data; and performs shake correction processing on the captured image so as to cancel the shaking of the captured image caused by the movement and/or rotation of the vehicle 200. This makes it possible to identify the behavior of the vehicle 200 with high accuracy.

Further, in the present embodiment, the behavior data acquisition unit 112 identifies the magnitude of behavior and the frequency of behavior based on the behavior data, and when the magnitude of behavior having a specific frequency is equal to or greater than a threshold, the image processing unit 114 performs shake correction processing on the captured image. This makes it possible to perform shake correction processing on the captured image when the behavior occurring may cause VR sickness.

Further, in the present embodiment, the image processing unit 114 thickens the window frame included in the vehicle interior image. This makes it possible to eliminate the shift between the scenery image on which the shake correction processing has been performed and the inside of the vehicle.

Further, in the present embodiment, the image processing unit 114 corrects the captured image by enlarging one of the scenery image and the vehicle interior image. This makes it possible to eliminate the shift between the image on which the shake correction processing has been performed and the image on which the shake correction processing has not been performed.

Further, in the present embodiment, the image processing unit 114 performs color processing on a boundary portion between the scenery image on which the shake correction processing has been performed and the vehicle interior image. This makes it possible to provide the user with an image in which a boundary between an image on which the shake correction processing has been performed and an image on which the shake correction processing has not been performed does not look unnatural.

Further, in the present embodiment, for a captured image being a vehicle interior image, the image processing unit 114 does not perform shake correction processing on the captured image, and for a captured image being a scenery image, the image processing unit 114 performs shake correction processing on the captured image. This makes it possible to perform shake correction processing in accordance with the timing of displaying an image that may cause VR sickness to prevent image shaking that may cause VR sickness.

Note that, in a modification example of the present embodiment, the image processing unit 114 has a correction mode in which shake correction processing is performed on the captured image and a non-correction mode in which shake correction processing is not performed on the captured image so that the image processing unit 114 can select the correction mode or the non-correction mode according to the user's selection. Thus, it is possible to select the correction mode or the non-correction mode in response to a command from the user.

Further, in a modification example of the present embodiment, the image processing device 100 may distribute an image for VR display to a network by using the image processing unit 114. This allows the second user to view a VR image online or offline.

Note that, in the present embodiment, the image processing device 100 may be provided in the vehicle 200. Specifically, the in-vehicle controller 210 may have the functional blocks included in the controller 110, such as the image acquisition unit 111, and construct a VR system by communication between the vehicle 200 and the terminal device 300 without going through a server. Further, in the case where the in-vehicle controller 210 has the functional blocks included in the controller 110, such as the image acquisition unit 111, the shake correction processing of the image processing unit 114 may be performed by a mobile terminal that has a camera and can be brought into the vehicle.

Note that, in the image processing system 10 according to a modification example of the present embodiment, in a case where the interior camera 211 is fixed inside the vehicle through a vibration-absorbing head (camera mount), the image processing unit 114 may perform shake correction processing on the vehicle interior image and may not perform shake correction processing on the scenery image. The head has a mechanism that moves a pedestal for fixing the camera according to the behavior of the vehicle 200, for example. The head may have a mechanism with a support member such as a tripod. When the vehicle behaves in the state where the interior camera 211 is fixed inside the vehicle through the head, the head absorbs the vibration, so that the behavior of the vehicle is not transmitted to the interior camera 211. On the other hand, the behavior is transmitted to the internal equipment of the vehicle such as the dashboard and pillars. Therefore, when the captured image from the interior camera 211 includes a scenery image, the scenery image does not shake, and the vehicle interior image shakes. In such a case, the image processing unit 114 performs shake correction processing on the vehicle interior image, and does not perform shake correction processing on the scenery image. The image processing unit 114 synthesizes the vehicle interior image on which image processing has been performed by the shake correction processing and the scenery image on which image processing has not been performed by the shake correction processing. Then, the image processing unit 114 stores, in the memory, data of the captured image on which the synthesis processing has been performed.

In the modification example of the present embodiment, the image processing unit 114 identifies a scenery image and a vehicle interior image from the captured image; performs shake correction processing on the vehicle interior image; and synthesizes the vehicle interior image on which image processing has been performed by the shake correction processing and the scenery image on which image processing has not been performed by the shake correction processing. In other words, in the present embodiment, the image processing unit 114 identifies a scenery image and a vehicle interior image from the captured image; performs shake correction processing on one of the scenery image or the vehicle interior image; and synthesizes the image which is one of the scenery image and the vehicle interior image and on which image processing has been performed by the shake correction processing and the other image on which image processing has not been performed by the shake correction processing. This makes it possible for the second user to feel as if the second user were actually riding in the vehicle when the second user views the synthesized image and to be provided with an image with reduced VR sickness.

Note that the embodiment described above is described to facilitate understanding of the present invention, and is not described to limit the present invention. Therefore, the elements disclosed in the above embodiment are meant to include all design changes and equivalents that fall within the technical scope of the present invention.

REFERENCE SIGNS LIST

10 Image processing system
100 Image processing device
111 Image acquisition unit
112 Behavior data acquisition unit
113 Determination unit
114 Image processing unit
115 Transmission unit
116 Reception unit
120 Communication device
200 Vehicle
300 Terminal device

The invention claimed is:

1. An image processing device comprising:
a communication device for communicating with an in-vehicle communication device; and
a controller configured to:
acquire a captured image captured by an imaging device fixed to a moving object;
acquire behavior data indicating behavior of the moving object when moving;
determine whether or not the captured image includes scenery outside the moving object; and
when the captured image is determined to include the scenery outside the moving object, identify, from the captured image, a scenery image representing the scenery outside the moving object and a moving object interior image representing an inside of the moving object;
perform, based on the behavior data acquired, shake correction processing on the scenery image so as to cancel the shaking of the captured image due to the behavior of a vehicle; and
perform image processing to eliminate a gap of a boundary portion between the scenery image on which the shake correction processing has been performed and the moving object interior image.

2. The image processing device according to claim 1, wherein
the controller is configured to:
perform the shake correction processing on one of the scenery image and the moving object interior image; and
synthesize, among the scenery image and the moving object interior image, one image on which image processing has been performed by the shake correction processing and another image on which image processing has not been performed by the shake correction processing.

3. The image processing device according to claim 2, wherein the controller is configured to transmit a signal including the synthesized image to a display device located outside the moving object.

4. The image processing device according to claim 1, wherein
the controller is configured to identify a vertical movement of the moving object and/or a rotation of the moving object about a vertical axis of the moving object based on the behavior data,
a vertical direction of the moving object is normal to a surface on which the moving object is traveling, and
the controller is configured to perform the shake correction processing on the captured image so as to cancel shaking of the captured image caused by the movement and/or the rotation.

5. The image processing device according to claim 1, wherein
the controller is configured to identify a magnitude of the behavior and a frequency of the behavior based on the behavior data, and
the controller is configured to perform the shake correction processing on the captured image when the magnitude of the behavior having a specific frequency is equal to or greater than a threshold.

6. The image processing device according to claim 1, wherein
the controller is configured to:
thicken a window frame of the moving object included in the moving object interior image.

7. The image processing device according to claim 1, wherein
the controller is configured to:
enlarge one of the scenery image and the moving object interior image.

8. The image processing device according to claim 1, wherein
the controller is configured to:
perform color processing on a boundary portion between the scenery image on which the shake correction processing has been performed and the moving object interior image.

9. The image processing device according to claim 1, wherein
the controller is configured to:
not perform the shake correction processing on the captured image when the captured image is a moving object interior image representing an inside of the moving object; and
perform the shake correction processing on the captured image when the captured image is a scenery image representing the scenery outside the moving object.

10. The image processing device according to claim 1, wherein
the controller is configured to select a mode in which the shake correction processing is performed on the captured image or a mode in which the shake correction processing is not performed on the captured image.

11. The image processing device according to claim 1, wherein the controller is configured to enlarge the image of either the boundary portion of the moving object interior image or the boundary portion of the scenery image to eliminate the gap.

12. An image processing method of performing image processing by a processor, the image processing method comprising:
acquiring a captured image captured by an imaging device fixed to a moving object;
acquiring behavior data indicating behavior of the moving object when moving;
determining whether or not the captured image includes scenery outside the moving object; and
when the captured image is determined to include the scenery outside the moving object, identifying, from the captured image, a scenery image representing the scenery outside the moving object and a moving object interior image representing an inside of the moving object;
performing, based on the behavior data acquired, shake correction processing on the scenery image so as to cancel the shaking of the captured image due to the behavior of a vehicle; and
performing image processing to eliminate a gap of a boundary portion between the scenery image on which the shake correction processing has been performed and the moving object interior image.

* * * * *